United States Patent
Lee et al.

(10) Patent No.: US 8,385,446 B2
(45) Date of Patent: Feb. 26, 2013

(54) RECEIVING APPARATUS AND METHOD FOR MAXIMUM LIKELIHOOD IN A SINGLE CARRIER SYSTEM

(75) Inventors: Jong-Ho Lee, Seoul (KR); Joo-Hyun Lee, Suwon-si (KR); Sung-Hwan Kim, Suwon-si (KR); Jong-Hyeuk Lee, Anyang-si (KR); Sung-Yoon Jung, Seoul (KR); Chungyong Lee, Seoul (KR); Jaesang Ham, Seoul (KR); Myoung-Seok Kim, Seoul (KR)

(73) Assignees: Samsung Electronics Co., Ltd., Suwon-si (KR); Industry-Academic Cooperation Foundation, Yonsei University, Seoul (KR)

( * ) Notice: Subject to any disclaimer, the term of this patent is extended or adjusted under 35 U.S.C. 154(b) by 1001 days.

(21) Appl. No.: 12/384,156

(22) Filed: Apr. 1, 2009

(65) Prior Publication Data

US 2009/0252246 A1 Oct. 8, 2009

(30) Foreign Application Priority Data

Apr. 3, 2008 (KR) ........................ 10-2008-0031150

(51) Int. Cl.
*H04L 5/12* (2006.01)

(52) U.S. Cl. ........ 375/262; 375/260; 375/265; 375/267; 375/299; 375/316; 375/340; 375/341; 375/347; 455/101; 455/132; 455/296; 455/500; 455/562.1; 370/210; 370/334; 370/464; 370/480; 714/751; 714/752; 714/794; 714/795; 714/796

(58) Field of Classification Search ................. 375/260, 375/262, 265, 267, 299, 316, 340, 341, 347; 455/101, 132, 296, 500, 562.1; 370/210, 370/334, 464, 480; 714/751, 752, 794, 795, 714/796

See application file for complete search history.

(56) References Cited

U.S. PATENT DOCUMENTS

| | | | |
|---|---|---|---|
| 2004/0131011 A1* | 7/2004 | Sandell et al. | 370/210 |
| 2005/0243943 A1* | 11/2005 | Stirling-Gallacher | 375/267 |
| 2007/0189151 A1* | 8/2007 | Pan et al. | 370/210 |
| 2007/0211815 A1* | 9/2007 | Pan et al. | 375/267 |

* cited by examiner

*Primary Examiner* — Leon Flores

(57) ABSTRACT

A receiving apparatus and method of a Maximum Likelihood (ML) scheme in a Single-Carrier (SC) system are provided. The apparatus includes at least two antennas, at least two Orthogonal Frequency Division Multiplexing (OFDM) demodulators, at least two subcarrier mappers, at least two OFDM modulators, and a detector. The antennas receive signals. The OFDM demodulators convert the signals into frequency domain signals. The subcarrier mappers confirm signals mapped to frequency domain subcarriers. The OFDM modulators convert the signals into time domain signals. The detector constructs at least one set for candidate transmission symbols and detects receive signals through ML detection using the set.

17 Claims, 9 Drawing Sheets

RECEIVING APPARATUS AND METHOD FOR MAXIMUM LIKELIHOOD IN A SINGLE CARRIER SYSTEM

CROSS-REFERENCE TO RELATED APPLICATION(S) AND CLAIM OF PRIORITY

The present application claims priority under 35 U.S.C. §119(a) to a Korean Patent Application filed in the Korean Intellectual Property Office on Apr. 3, 2008 and assigned Serial No. 10-2008-0031150, the contents of which are herein incorporated by reference.

TECHNICAL FIELD OF THE INVENTION

The present invention relates to a receiving apparatus and method of a Maximum Likelihood (ML) scheme in a Single-Carrier (SC) system. More particularly, the present invention relates to a receiving apparatus and method of an ML scheme using a multiple antenna in the SC system.

BACKGROUND OF THE INVENTION

With the development of a wireless communication technology, a demand for a large capacity data service such as a multimedia service from users is increasing. Thus, an Orthogonal Frequency Division Multiplexing (OFDM) transmission scheme enabling provision of a large capacity data service at a high speed has been highlighted.

If using the OFDM transmission scheme, a wireless communication system transmits one data stream through a plurality of subcarriers. In the wireless communication system of the OFDM transmission scheme, a high Peak to Average Power Ratio (PAPR) is generated by the plurality of subcarriers.

To reduce a high PAPR caused by the OFDM transmission scheme, an SC transmission scheme has been proposed. That is, if using the SC transmission scheme, a wireless communication system transmits one data stream through one carrier and thus, low PAPR performance is generated.

The wireless communication system of the SC transmission scheme can additionally use a multiple antenna technology to maximize transmission performance. In this case, the wireless communication system of the SC transmission scheme has an advantage of maintaining the merits of the SC transmission scheme while being capable of achieving diversity gain and space multiplexing gain by the multiple antenna technology.

To enhance reception performance, a multiple antenna system uses an ML scheme. If using the ML scheme, a receive end determines Euclidian distances between all candidate transmission symbols that a transmit end can transmit and a receive signal. After that, the receive end selects a candidate transmission symbol having the shortest Euclidean distance as a symbol of the receive signal.

If a multiple antenna system of an SC transmission scheme uses an ML scheme, a receive end detects a receive signal by applying the ML scheme in a time domain. That is, a signal that the receive end receives through an $n^{th}$ time resource includes, by multipath fading, not only a signal that a transmit end transmits through the $n^{th}$ time resource but also a signal that the transmit end transmits through a previous time resource. Thus, the receive end determines Euclidean distances between not only all candidate transmission symbol vectors that the transmit end can transmit through the $n^{th}$ time resource but also all candidate transmission symbol vectors that the transmit end can transmit through the previous time resource, and a signal that the receive end itself receives through the $n^{th}$ time resource.

After that, the receive end selects a candidate transmission symbol having the shortest Euclidean distance as a symbol of the signal received through the $n^{th}$ time resource.

As described above, if a multiple antenna system using an SC transmission scheme uses an ML scheme, a receive end has to consider even candidate transmission symbol vectors that a transmit end can transmit through a previous time resource. Thus, there is a problem that the complexity of the receive end increases if the multiple antenna system using the SC transmission scheme uses the ML scheme.

SUMMARY OF THE INVENTION

To address the above-discussed deficiencies of the prior art, it is a primary aspect of the present invention to address at least the above mentioned problems and/or disadvantages and to provide at least the advantages described below. Accordingly, an aspect of the present invention is to substantially solve at least the above problems and/or disadvantages and to provide at least the advantages below. Accordingly, one aspect of the present invention is to provide an apparatus and method for reducing complexity caused by applying a Maximum Likelihood (ML) reception scheme in a multiple antenna system of a Single-Carrier (SC) transmission scheme.

Another aspect of the present invention is to provide an apparatus and method for constructing a set of constellations for a vector candidate symbol for a multiple dimension and reducing complexity caused by applying an ML reception scheme in a multiple antenna system of an SC transmission scheme.

A further aspect of the present invention is to provide an apparatus and method for constructing a set of constellations for a vector candidate symbol for a multiple dimension on the basis of channel information in a multiple antenna system of an SC transmission scheme.

The above aspects are achieved by providing a receiving apparatus and method of an ML scheme in an SC system According to one aspect of the present invention, an apparatus for detecting signals in a wireless communication system of an SC transmission scheme is provided. The apparatus includes at least two antennas, at least two Orthogonal Frequency Division Multiplexing (OFDM) demodulators, at least two subcarrier mappers, at least two OFDM modulators, and a detector. The at least two antennas receive signals. The at least two OFDM demodulators convert the signals received through the respective antennas into frequency domain signals. The at least two subcarrier mappers confirm signals mapped to frequency domain subcarriers allocated to the respective antennas in the frequency domain signals received from the respective OFDM demodulators. The at least two OFDM modulators convert the signals received from the respective subcarrier mappers into time domain signals. The detector constructs at least one set for candidate transmission symbols transmissible from a transmit end on the basis of a channel confirmed through the time domain signals, and detects receive signals through ML detection using the set.

According to another aspect of the present invention, a method for detecting signals in a wireless communication system of an SC transmission scheme is provided. The method includes, if signals are received through at least two antennas, estimating a channel using time domain signals received through the respective antennas; constructing at least one set for candidate transmission symbols transmissible from a transmit end considering the estimated channel; constructing trellises of receivable candidate transmission symbols depending on multipath fading; using the set of candidate transmission symbols; and selecting, as a symbol for a receive signal, a trellis whose error with the receive signal is least among the constructed trellises.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Exemplary embodiments of the present invention provide technology for detecting signals in a Maximum Likelihood (ML) scheme in a multiple antenna system of a Single-Carrier (SC) transmission scheme according to an exemplary embodiment of the present invention is described below.

The following description is based on the assumption that a multiple antenna system uses a Frequency Division Multiple Access (FDMA) scheme based on SC. However, exemplary embodiments of the present invention are equally applicable even when a multiple antenna system of an SC transmission scheme uses any other division multiple access scheme.

Figure 1:
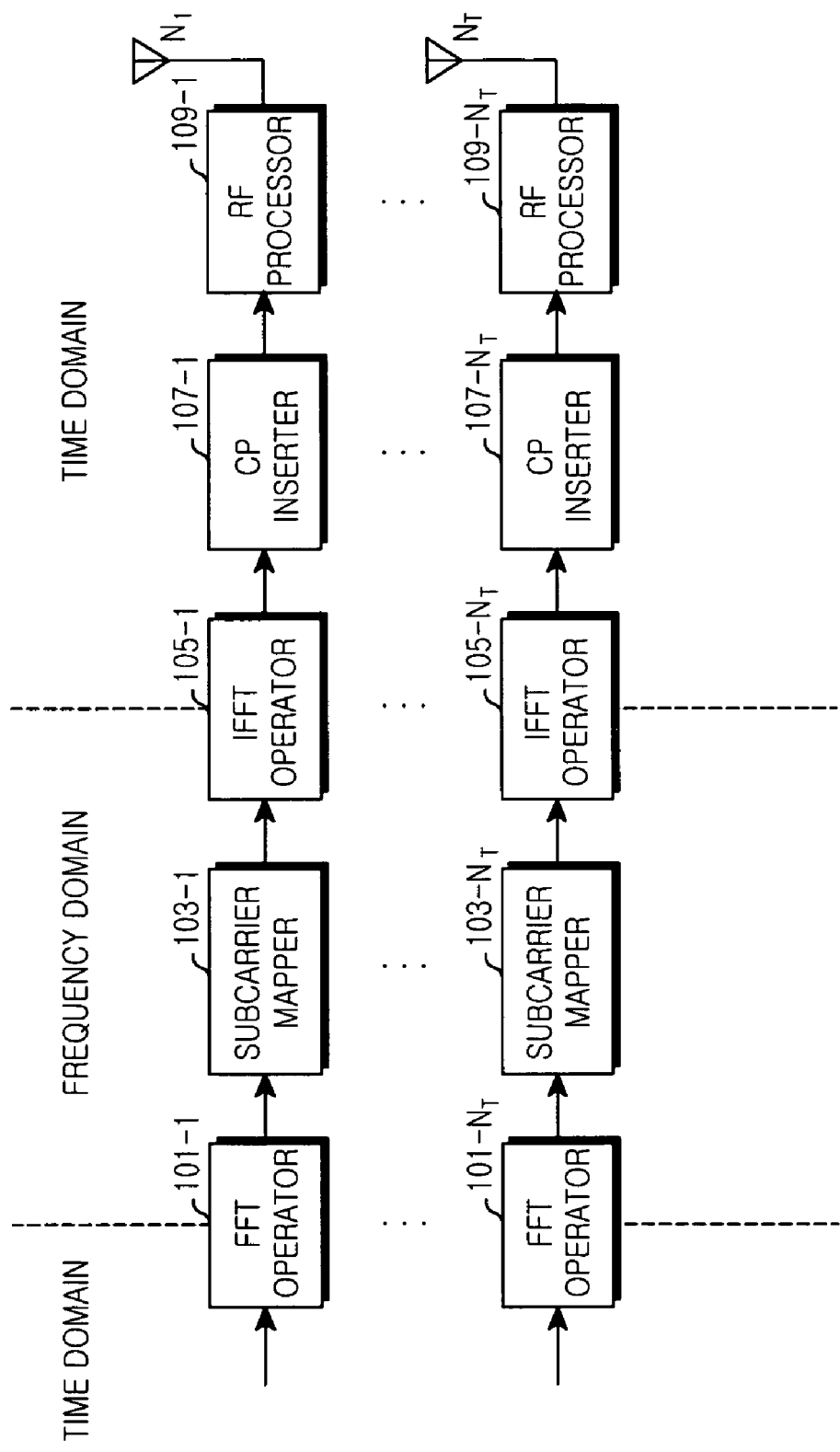
FIG. 1 illustrates a construction of a transmit end in a multiple antenna system of a Single-Carrier (SC) transmission scheme according to an exemplary embodiment of the present invention.

In the case of using the SC-FDMA transmission scheme, a transmit end of the multiple antenna system is constructed as illustrated in FIG. 1.

FIG. 1 is a block diagram illustrating a construction of a transmit end in a multiple antenna system of a Single-Carrier (SC) transmission scheme according to an exemplary embodiment of the present invention.

As illustrated in FIG. 1, the transmit end includes a Fast Fourier Transform (FFT) operators 101-1 to 101-$N_T$, subcarrier mappers 103-1 to 103-$N_T$, Inverse Fast Fourier Transform (IFFT) operators 105-1 to 105-$N_T$, Cyclic Prefix (CP) inserters 107-1 to 107-$N_T$, and Radio Frequency (RF) processors 109-1 to 109-$N_T$.

The FFT operators 101-1 to 101-$N_T$ convert time-domain transmit signals into frequency domain signals through FFT.

The subcarrier mappers 103-1 to 103-$N_T$ map the frequency domain signals received from the respective FFT operators 101-1 to 101-$N_T$ to corresponding subcarriers. The subcarrier mappers 103-1 to 103-$N_T$ map the frequency domain signals received from the respective FFT operators 101-1 to 101-$N_T$ to subcarriers of partial frequency bands used by respective antennas.

The IFFT operators 105-1 to 105-$N_T$ convert the frequency domain signals mapped to the corresponding subcarriers in the respective subcarrier mappers 103-1 to 103-$N_T$ into time domain signals through IFFT.

The CP inserters 107-1 to 107-$N_T$ insert guard intervals (e.g., prefixes) into the signals received from the respective IFFT operators 105-1 to 105-$N_T$ so as to eliminate their own signal noise (i.e., inter-symbol interference) generated because of a multipath fading phenomenon of a wireless channel.

The RF processors 109-1 to 109-$N_T$ convert baseband signals received from the respective CP inserters 107-1 to 107-$N_T$ into high frequency signals and output the high frequency signals through the respective antennas.

If the above-constructed transmit end transmits signals, a receive end detects signals received through respective antennas using a construction illustrated in FIG. 2 below.

Figure 2:
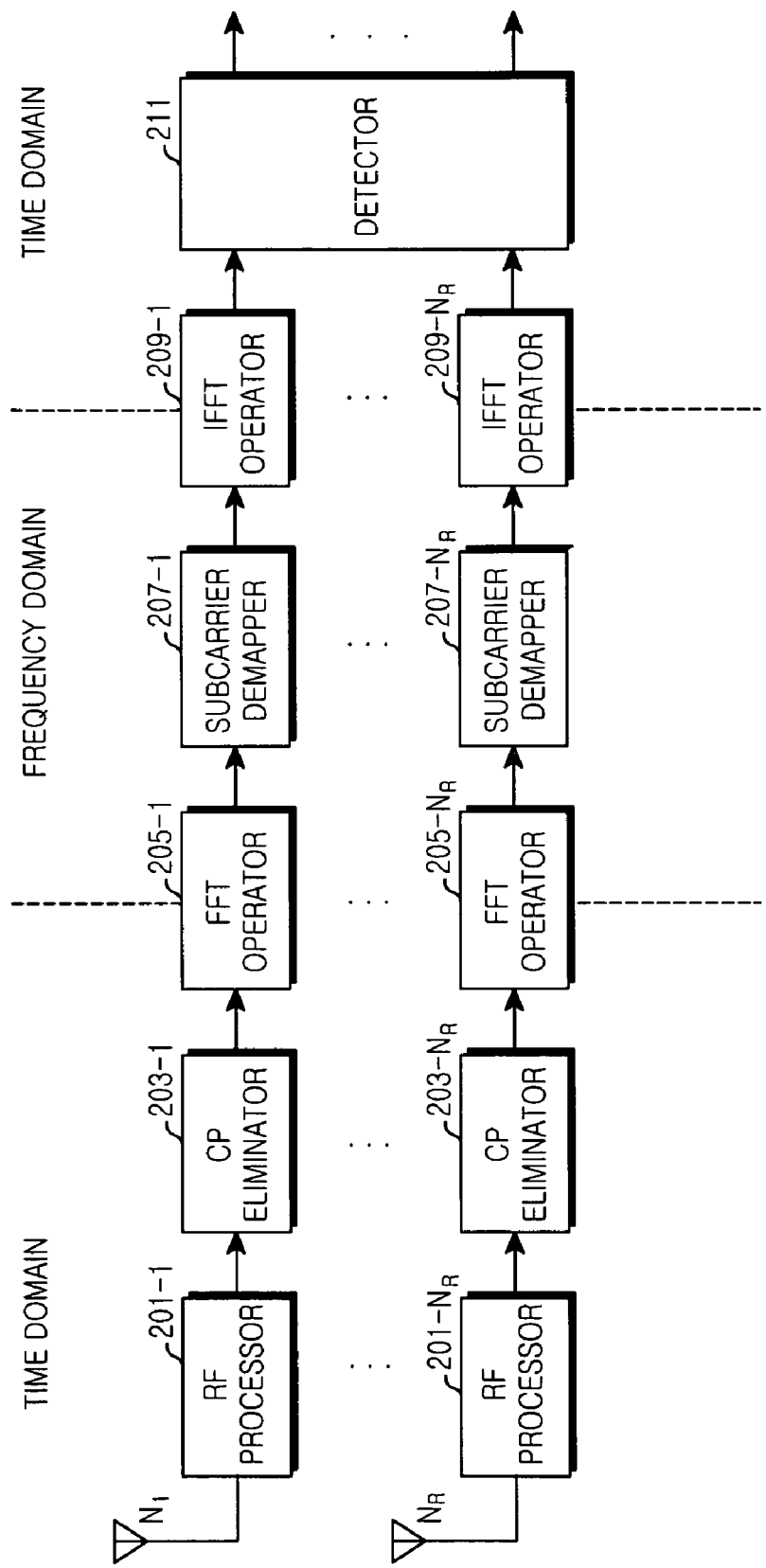
FIG. 2 illustrates a construction of a receive end in a multiple antenna system of an SC transmission scheme according to an exemplary embodiment of the present invention.

FIG. 2 is a block diagram illustrating a construction of a receive end in a multiple antenna system of an SC transmission scheme according to an exemplary embodiment of the present invention.

As illustrated in FIG. 2, the receive end includes RF processors 201-1 to 201-$N_R$, CP eliminators 203-1 to 203-$N_R$, FFT operators 205-1 to 205-$N_R$, subcarrier demappers 207-1 to 207-$N_R$, IFFT operators 209-1 to 209-$N_R$, and a detector 211.

The RF processors 201-1 to 201-$N_R$ convert high frequency receive signals received through respective antennas into baseband signals.

The CP eliminators 203-1 to 203-$N_R$ eliminate guard intervals from the baseband signals received from the respective RF processors 201-1 to 201-$N_R$.

The FFT operators 205-1 to 205-$N_R$ convert the signals received from the respective CP eliminators 203-1 to 203-$N_R$ into frequency domain signals through FFT.

The subcarrier demappers 207-1 to 207-$N_R$ extract specific-band signals from the frequency domain signals that are received from the respective FFT operators 205-1 to 205-$N_R$.

The IFFT operators 209-1 to 209-$N_R$ convert the frequency domain signals extracted in the respective subcarrier demappers 207-1 to 207-$N_R$ into time domain signals through IFFT.

The detector 211 detects receive signals using the signals received from the IFFT operators 209-1 to 209-$N_R$. For example, if the detector 211 uses an ML scheme, the detector 211 detects receive signals using Equation 1 below:

$$\hat{s}_{ML} = \min_{S} \sum_{n=1}^{N_{FFT}} \left\| r_n - \sum_{l=0}^{L-1} H_l s_{n-l} \right\|^2 \quad [\text{Eqn. 1}]$$

$$= \min_{S} \sum_{n=1}^{N_{FFT}} \| r_n - H_0 s_n - g(S_n) \|^2$$

$$\text{where } g(S_n) = \sum_{l=1}^{L-1} H_l s_{n-l}$$

$$\text{and state } S_n = \{s_{n-1}, s_{n-2}, \ldots, s_{n-L+1}\}$$

In Equation 1, the '$\hat{s}_{ML}$' represents a receive signal detected using an ML scheme in the detector 211, the '$r_n$' represents a signal that the receive end receives through an $n^{th}$ time resource, the '$H_l$' represents a channel matrix with a transmit end, and the '$s_n$' represents candidate transmission symbol vectors for a signal transmitted from the transmit end through the $n^{th}$ time resource. By multipath fading, the '$r_n$' includes not only a signal that the transmit end transmits through the $n^{th}$ time resource but also signals that the transmit end transmits through a previous time resource. An amount of the signals included in the '$r_n$', which are transmitted by the transmit end through the previous time resource, is determined depending on a channel length of the '$r_n$'. For example, if the channel length of the '$r_n$' is equal to '2', the receive end determines Euclidean distances with a receive signal considering all candidate transmission symbol vectors that the transmit end can transmit through the $n^{th}$ time resource and an $(n-1)^{th}$ time resource.

The detector 211 determines Euclidean distances with a signal received through the $n^{th}$ time resource in consideration of not only all candidate transmission symbol vectors that the transmit end can transmit through the $n^{th}$ time resource but also candidate transmission symbol vectors that the transmit end can transmit through the previous time resource as given in Equation 1. Thereafter, the receive end selects a candidate transmission symbol vector having the shortest Euclidean distance as a symbol of the receive signal.

However, if considering even the candidate transmission symbol vectors that the transmit end can transmit through the previous time resource as in Equation 1, the complexity of the detector 211 of the receive end to determine Euclidean distances increases by exponential of a channel length.

Figure 6:
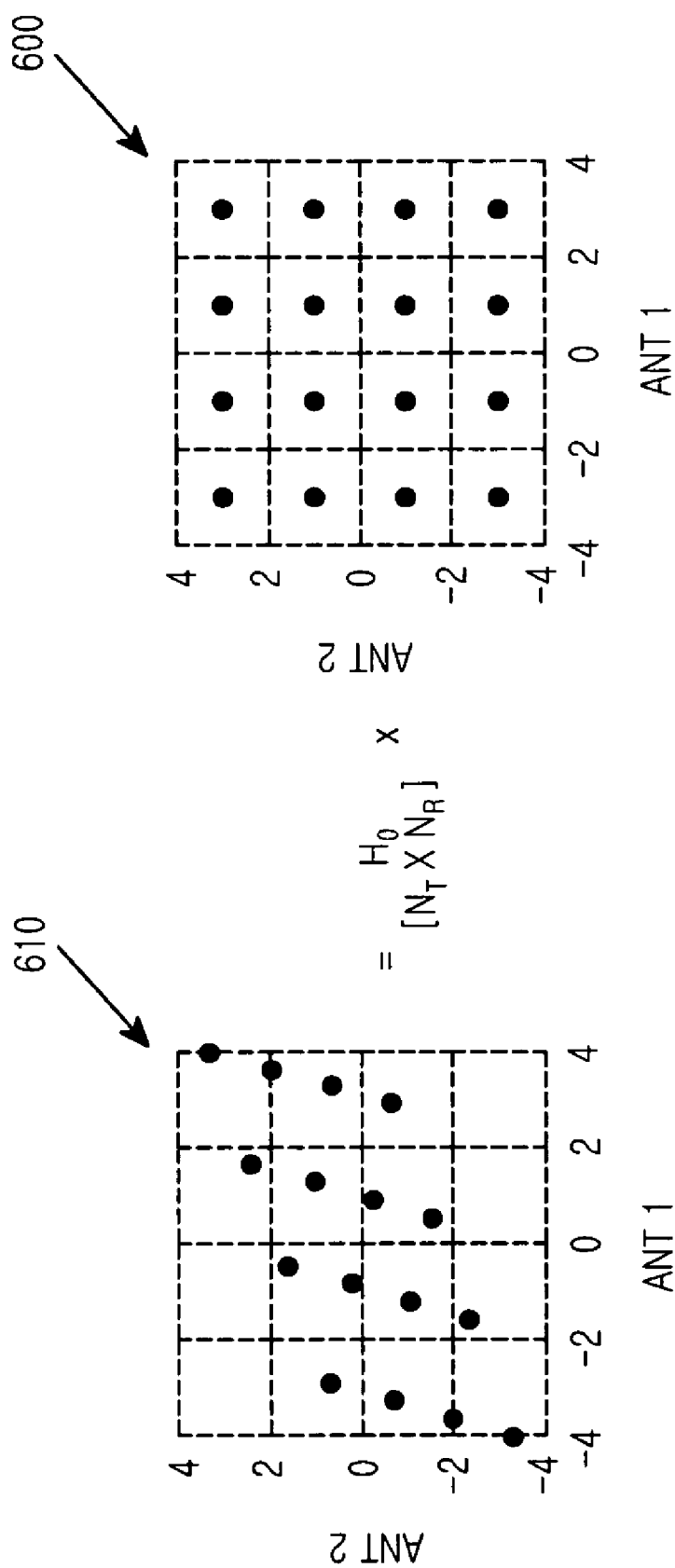
FIG. 6 illustrates a variation of a constellation depending on a channel in a multiple antenna system of an SC transmission scheme according to an exemplary embodiment of the present invention.

To provide a solution to this, the detector 211 constructs a set of candidate transmission symbols transmissible from a transmit end on the basis of a channel. For example, the candidate transmission symbols transmissible from the transmit end go through a channel while being deformed as illustrated in FIG. 6 below. Here, the transmit end maps each candidate transmission symbol to a constellation determined depending a modulation scheme and transmits the transmission symbol and thus, the candidate transmission symbol is used with the same meaning as that of the constellation.

FIG. 6 is a graph illustrating a variation of a constellation depending on a channel in a multiple antenna system of an SC transmission scheme according to an exemplary embodiment of the present invention.

As illustrated in FIG. 6, if a transmit end and a receive end each include two antennas and the transmit end uses a Quadrature Phase Shift Keying (QPSK) modulation scheme, the transmit end transmits a transmit signal using sixteen constellations 600.

The sixteen constellations 600 used for the transmit end to transmit signals go through a channel ($H_0$) while being deformed. That is, the receive end receives signals using the deformed constellations 610.

As described above, because constellations used for a transmit end are deformed when going through a channel, the detector 211 constructs a set of candidate transmission symbols transmissible from the transmit end on the basis of the channel.

After that, the detector 211 determines Euclidean distances with a receive signal using the set of candidate transmission symbols. For example, the detector 211 can be constructed as illustrated in FIG. 3 below.

Figure 3:
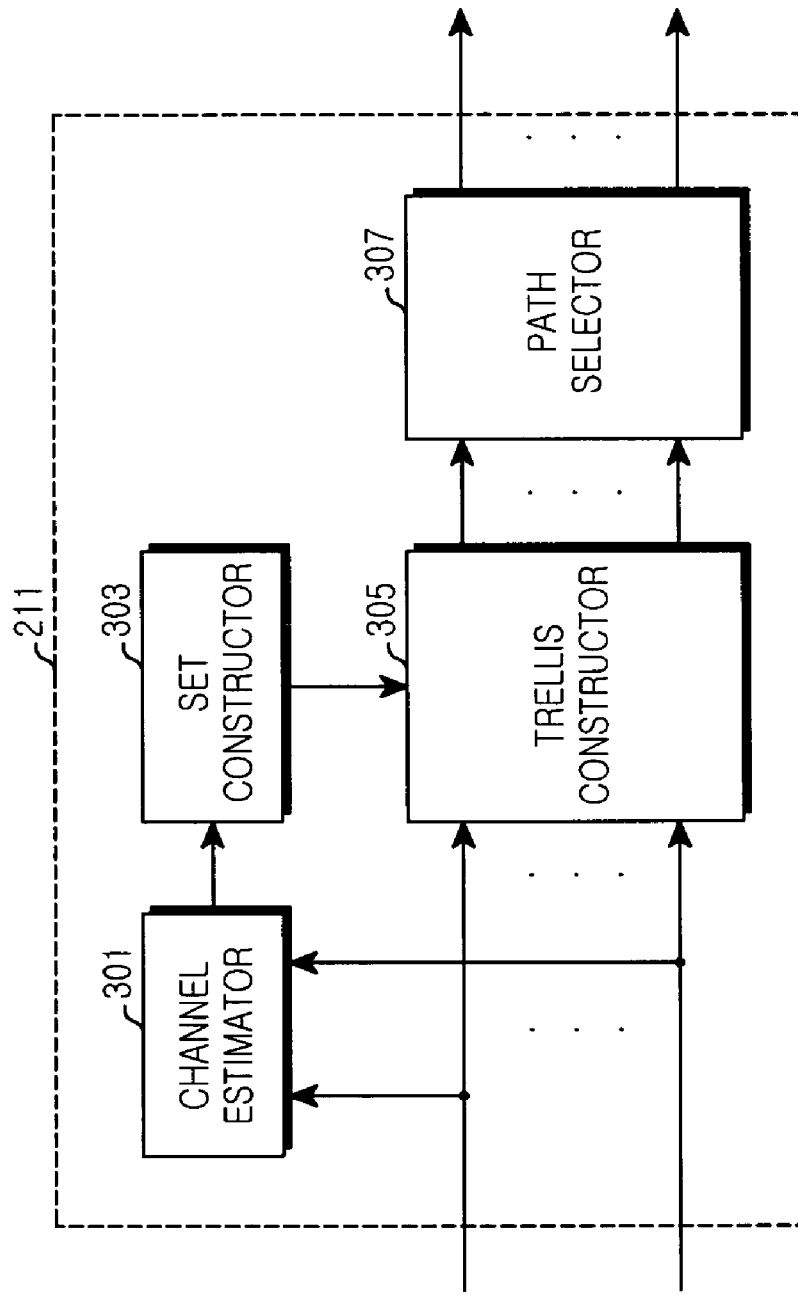
FIG. 3 illustrates a construction of a detector in a multiple antenna system of an SC transmission scheme according to an exemplary embodiment of the present invention.

FIG. 3 is a detailed block diagram illustrating a construction of a detector in a multiple antenna system of an SC transmission scheme according to an exemplary embodiment of the present invention.

As illustrated in FIG. 3, the detector 211 includes a channel estimator 301, a set constructor 303, a trellis constructor 305, and a path selector 307.

The channel estimator 301 estimates a channel using pilot signals included in signals received from the IFFT operators 209-1 to 209-$N_R$ through the respective antennas.

The set constructor 303 constructs a set of candidate transmission symbols considering channel information received from the channel estimator 301. For example, the set constructor 303 determines distances between candidate transmission symbols deformed through a channel. Then, the set constructor 301 constructs a set of candidate transmission symbols such that candidate transmission symbols having a small distance therebetween are grouped into a different set.

The trellis constructor 305 constructs a trellis using the set of candidate transmission symbols constructed in the set constructor 303. For example, the trellis constructor 305 determines the number of signals to be used to detect a signal received through an $n^{th}$ time resource depending on a channel length of the receive signal. That is, if the channel length is equal to '3', the detector 211 considers all candidate transmission symbols that a transmit end can transmit through a $(n-2)^{th}$ time resource, a $(n-1)^{th}$ time resource, and the $n^{th}$ time resource to detect a signal received through the $n^{th}$ time resource.

Thus, through the set of candidate transmission symbols, the trellis constructor 305 constructs trellises of candidate transmission symbols that the transmit end can transmit from the $(n-2)^{th}$ time resource to the $n^{th}$ time resource. The trellis represents a path of a signal received at a receive end. That is, if the transmit end can select a first set or a second set through each time resource, the receive end constructs a path for a set of candidate transmission symbols that the transmit end can transmit from the $(n-2)^{th}$ time resource to the $n^{th}$ time resource. For example, the receive end can receive signals that the transmit end transmits using the first set through the $(n-2)^{th}$ time resource, the second set through the $(n-1)^{th}$ time resource, and the first set through the $n^{th}$ time resource.

The path selector 307 applies the respective paths constructed in the trellis constructor 305 to a receive signal and selects a path whose error is least.

A method for detecting a receive signal using an ML scheme in a receive end of a multiple antenna system using an SC transmission scheme is described below.

Figure 4:
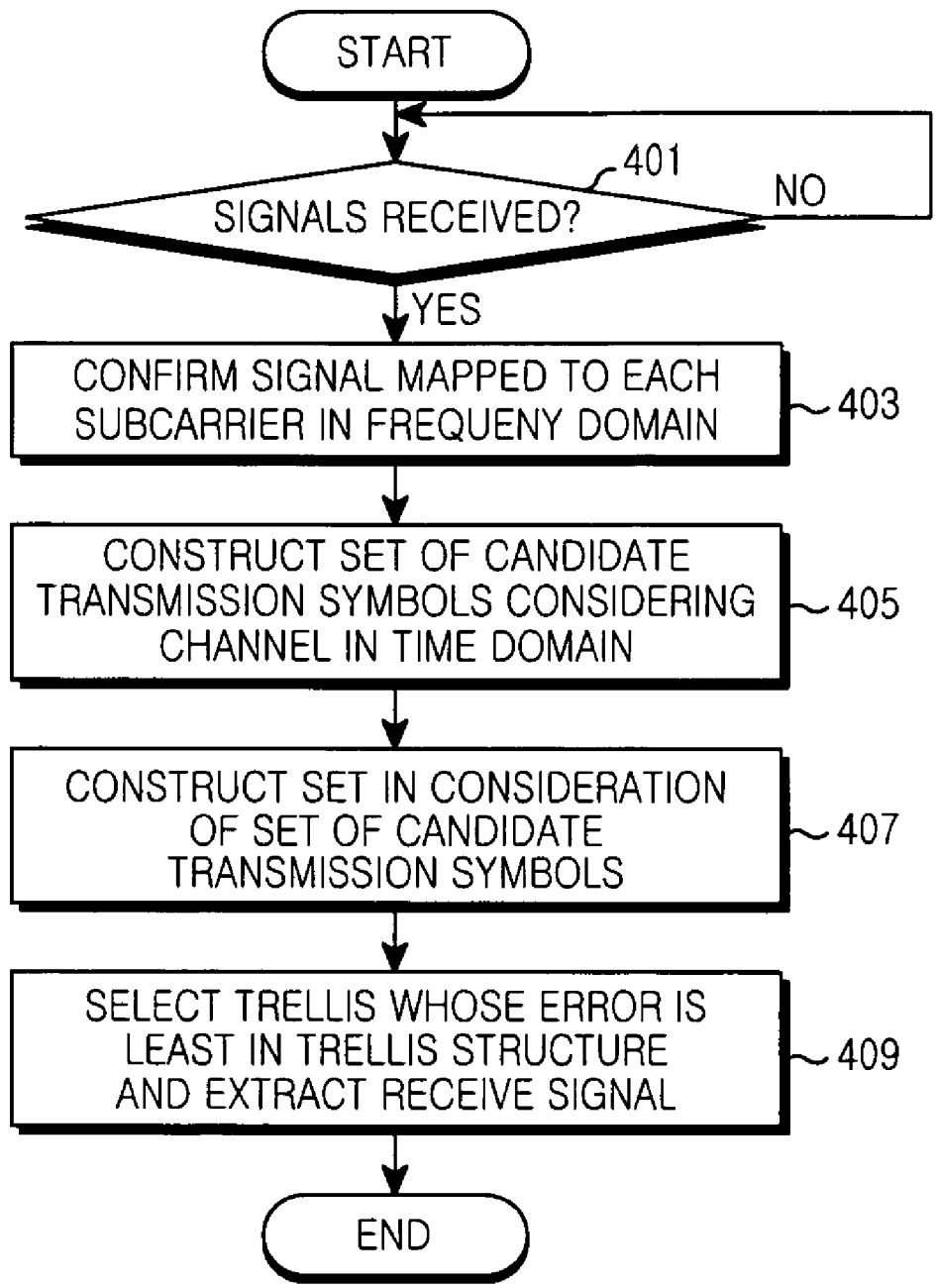
FIG. 4 illustrates a process of detecting a signal in a multiple antenna system of an SC transmission scheme according to an exemplary embodiment of the present invention.

FIG. 4 is a flow diagram illustrating a process of detecting a signal in a multiple antenna system of an SC transmission scheme according to an exemplary embodiment of the present invention.

Referring to FIG. 4, in step 401, a receive end confirms if signals are received through a plurality of receive antennas.

If the signals are received, in step 403, the receive end extracts signals mapped to subcarriers of specific frequency bands from the receive signals. For example, the receive end converts the receive signals into frequency domain signals. Then, the receive end extracts signals mapped to subcarriers of specific frequency bands from the frequency domain signals.

After extracting the mapped signals, in step 405, the receive end estimates a channel in the receive signals and constructs a set of candidate transmission symbols transmissible from a transmit end on the basis of channel information. The receive end determines distances between candidate transmission symbols and constructs a set such that candidate transmission symbols having a close distance therebetween are grouped into a different set. Here, the transmit end maps each candidate transmission symbol to a constellation determined depending on a modulation scheme and transmits the candidate transmission symbol and thus, the candidate transmission symbol and the constellation are used with the same meaning.

After constructing the set of candidate transmission symbols, in step 407, the receive end constructs trellises considering the set of candidate transmission symbols. The receive end determines a trellis length considering a length of a channel of a receive signal. The trellis represents a path through which the receive end can receive signals from the transmit end depending on the channel length. That is, if the transmit end can select a first set or a second set through each time resource, the receive end constructs a path of a set of candidate transmission symbols that the transmit end can transmit from a $(n-2)^{th}$ time resource to an $n^{th}$ time resource. For example, the receive end can receive signals transmitted using the first set through the $(n-2)^{th}$ time resource, the second set through the $(n-1)^{th}$ time resource, and the first set through the $n^{th}$ time resource.

After constructing the trellises, in step 409, the receive end applies the trellises to a receive signal and selects a trellis whose error is least among the trellises.

Then, the receive end terminates the process according to an exemplary embodiment of the present invention.

As described above, a receive end constructs trellises considering a set of candidate transmission symbols on the basis of a channel and reduces the complexity of an ML scheme. The receive end constructs a set of candidate transmission symbols as illustrated in FIG. 5 below.

Figure 5:
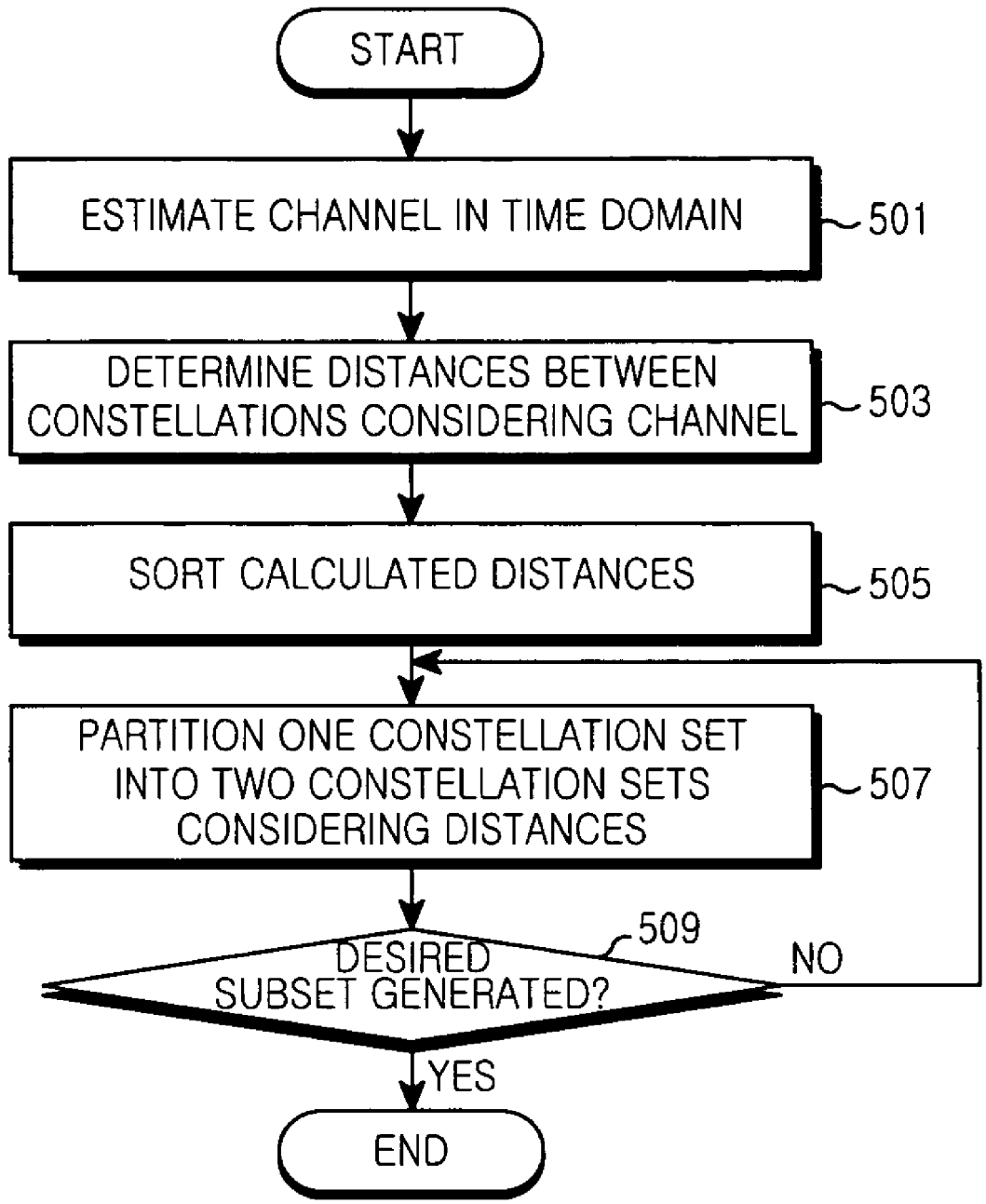
FIG. 5 illustrates a process of constructing a set of constellations in a multiple antenna system of an SC transmission scheme according to an exemplary embodiment of the present invention.

FIG. 5 is a flow diagram illustrating a process of constructing a set of constellations in a multiple antenna system of an SC transmission scheme according to an exemplary embodiment of the present invention.

Referring to FIG. 5, in step 501, a receive end estimates a channel with a transmit end using time domain signals received through respective antennas. The receive end estimates a channel with the transmit end using pilot signals among the time domain signals.

After estimating the channel, in step 503, the receive end determines distances between constellations deformed through the channel. For example, the constellations are deformed to predetermined patterns through the channel as in FIG. 7.

Figure 7:
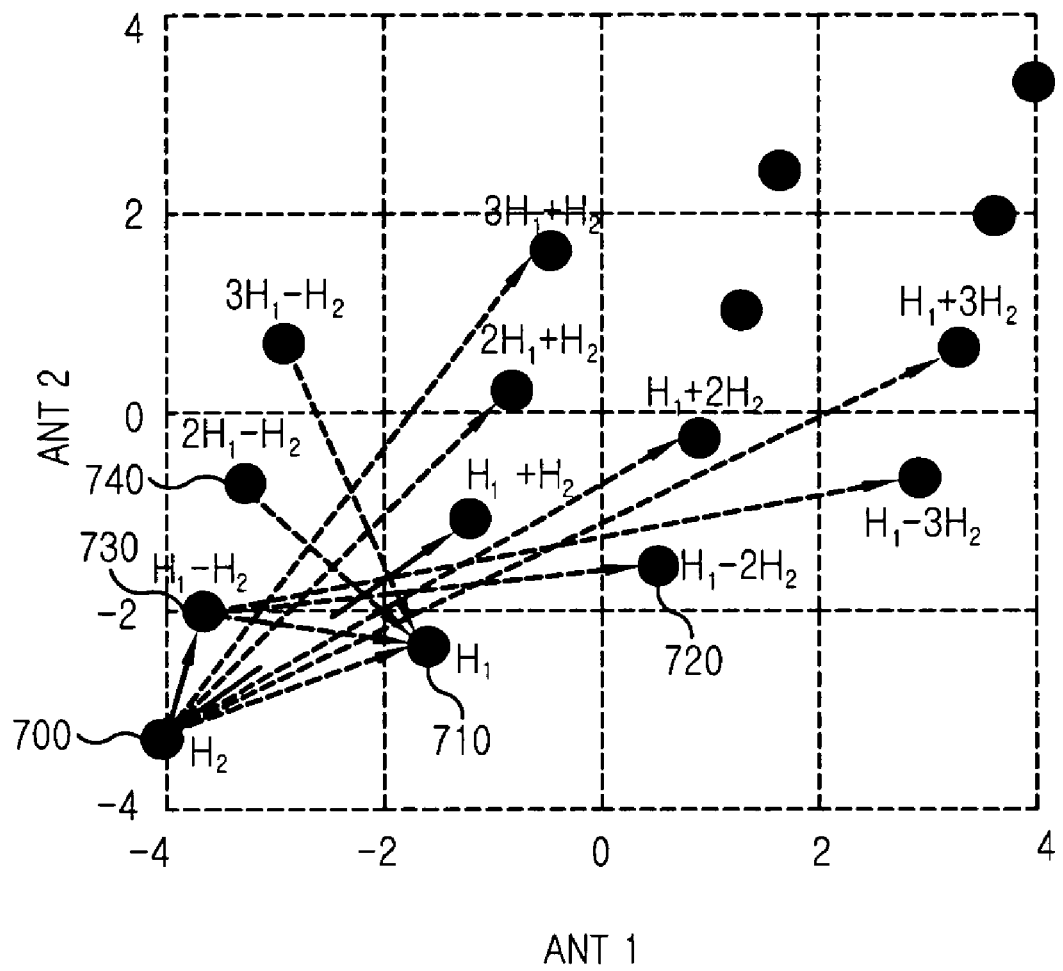
FIG. 7 illustrates distances between constellations in a multiple antenna system of an SC transmission scheme according to an exemplary embodiment of the present invention.

FIG. 7 is a graph illustrating distances between constellations in a multiple antenna system of an SC transmission scheme according to an exemplary embodiment of the present invention.

As in FIG. 7, when constellations are deformed through a channel, the constellations are deformed to predetermined patterns and constellations having the same distance therebetween are generated. For example, a distance between a first constellation 700 and a second constellation 710 is identical with a distance between the second constellation 710 and a third constellation 720. Also, a distance between the first constellation 700 and a fourth constellation 730 is identical with a distance between the fourth constellation 730 and a fifth constellation 740.

As described above, constellations deformed through a channel have predetermined patterns and thus, the receive end determines distances between all constellations using a row vector of a first tap of a channel matrix. The receive end does not repeatedly determine the same distance between the constellations. Also, the receive end constructs a set such that constellations having a short distance therebetween are grouped into a different set and thus, does not determine distances between constellations greater than a reference value.

After calculating the distances between constellations, in step 505, the receive end sorts the distances between constellations in length order.

Then, in step 507, the receive end partitions one constellation set into two constellation sets considering the distances between constellations. If first partitioning the constellation set, the receive end recognizes that the entire constellations are constructed as one set, and groups the entire constellations into two constellation sets. At this time, the receive end constructs a set such that constellations having a short distance therebetween are grouped into a different set. For example, the receive end constructs a set of constellations as illustrated in FIG. 8 below.

After partitioning the constellation set, in step 509, the receive end confirms if it generates a subset to be used for ML detection.

If failing to generate the subset to be used for ML detection, the receive end returns to step 507 and again partitions each set into two sets.

If generating the subset to be used for ML detection, the receive end terminates the process according to an exemplary embodiment of the present invention.

FIGS. 8A, 8B, 8C, and 8D are graphs illustrating a process of constructing a set of constellations in a multiple antenna system of an SC transmission scheme according to an exemplary embodiment of the present invention.

Figure 8A:
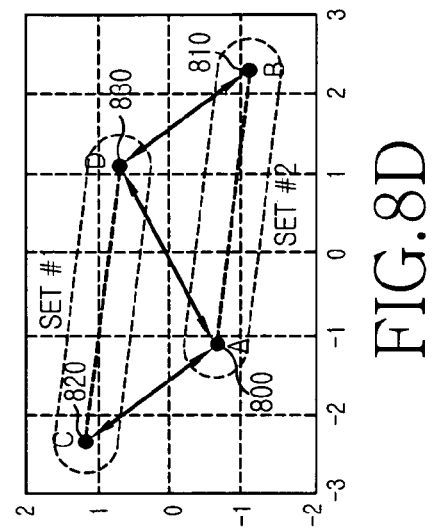
FIGS. 8A, 8B, 8C, and 8D illustrate a process of constructing a set of constellations in a multiple antenna system of an SC transmission scheme according to an exemplary embodiment of the present invention.
Figure 8B:
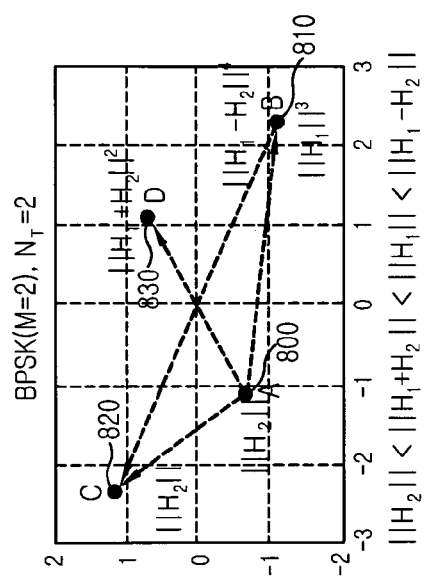
Figure 8C:
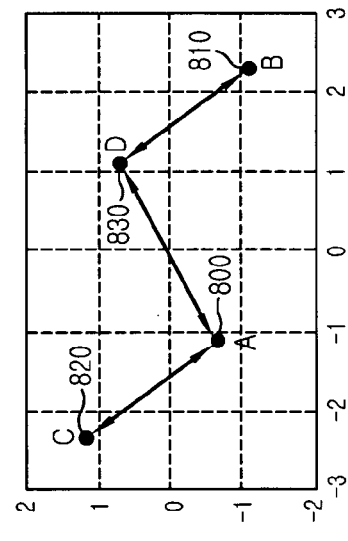
Figure 8D:
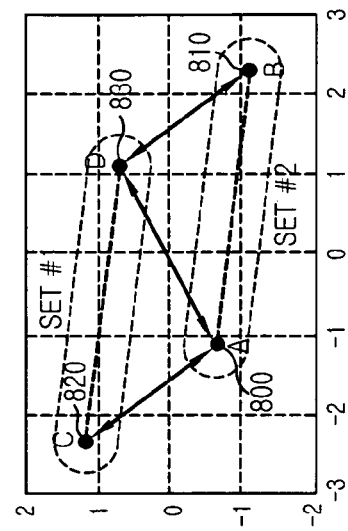

FIG. 8A illustrates distances between constellations for constructing a set, and FIGS. 8B to 8D illustrate a procedure for constructing a set.

As illustrated in FIG. 8A, if there are four constellations in one set, a distance between an 'A' constellation 800 and a 'C' constellation 820 and a distance between a 'B' constellation 810 and a 'D' constellation 830 are the shortest. Also, a distance between the 'A' constellation 800 and the 'D' constellation 830 is next short, and a distance between the 'B' constellation 810 and the 'C' constellation 820 is the longest.

As illustrated in FIG. 8B, the receive end confirms the constellations having the shortest distance therebetween in order to partition a set into two sets. After that, as illustrated in FIG. 8C, the receive end confirms the constellations having a second short distance therebetween.

If the constellations having the short distance therebetween are identified as above, as illustrated in FIG. 8D, the receive end constructs a set of constellations such that the constellations having the short distance therebetween are grouped into a different set.

In an exemplary embodiment of the present invention, a receive end determines only a distance between necessary constellations to reduce the complexity of operation for constructing a set, and groups the constellations into two sets in regular sequence.

In another exemplary embodiment of the present invention, a receive end may determine distances between all constellations deformed on the basis of a channel and construct a set of constellations.

The following description is for performance variation in the case of constructing a set of constellations on the basis of a channel and detecting a signal through an ML scheme considering the set of constellations in a multiple antenna system of an SC transmission scheme. The following description assumes that the multiple antenna system uses Binary Phase Shift Keying (BPSK) at a transmit end with two antennas and a channel length of a receive signal is equal to '3'.

Figure 9:
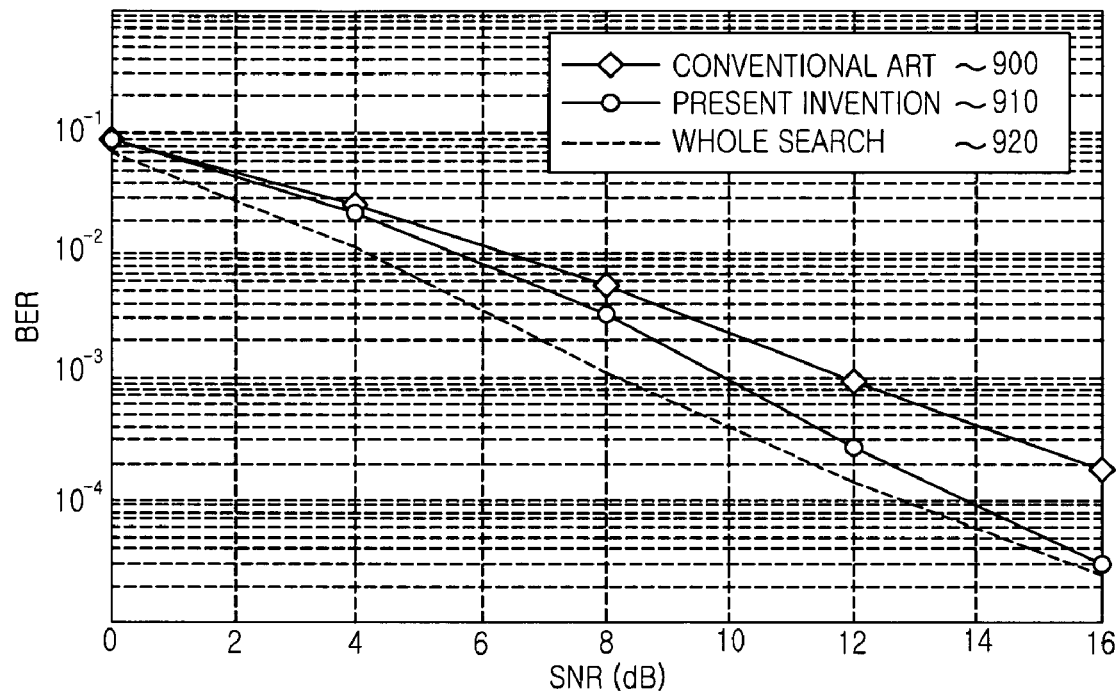
FIG. 9 illustrates a performance variation according to an exemplary embodiment of the present invention.

FIG. 9 is a graph illustrating a performance variation according to an exemplary embodiment of the present invention.

FIG. 9 illustrates comparisons between Bit Error Rates (BERs) versus Signal to Noise Ratios (SNRs) in a first scheme 910 of constructing a set of constellations on the basis of a channel, a second scheme 900 of constructing a set of constellations before deformation through a channel, and a third scheme 920 of not constructing a set. In FIG. 9, a horizontal axis denotes an SNR and a vertical axis denotes a BER.

As illustrated in FIG. 9, assuming the same SNR, the third scheme 920 has the lowest BER, the first scheme 910 has a next low BER, and the second scheme 900 has the highest BER.

However, the third scheme 920 has about four times of complexity compared to the first scheme 910 and second scheme 900. Thus, when considering complexity and BER all together, the first scheme 910 according to an exemplary embodiment of the present invention shows the best performance.

As described above, exemplary embodiments of the present invention have an advantage of reducing the complexity of a receive end depending on an ML scheme while being capable of enhancing reception performance, by constructing a set of constellations for a vector candidate symbol for a multiple dimension on the basis of channel information and detecting a signal in the ML scheme in a multiple antenna system of an SC transmission scheme.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An apparatus for detecting signals in a wireless communication system of a Single-Carrier (SC) transmission scheme, the apparatus comprising:
   at least two antennas configured to receive signals;
   at least two Orthogonal Frequency Division Multiplexing (OFDM) demodulators configured to convert the signals received through the respective antennas into frequency domain signals;
   at least two subcarrier mappers configured to confirm signals mapped to frequency domain subcarriers allocated to the respective antennas in the frequency domain signals received from the respective OFDM demodulators;
   at least two OFDM modulators configured to convert the signals received from the respective subcarrier mappers into time domain signals; and
   a detector comprising:
   a channel estimator configured to estimate a channel through the time domain signals;
   a set constructor configured to construct at least one set for candidate transmission symbols that the transmit end can transmit on the basis of the channel estimated in the channel estimator;
   a trellis constructor configured to construct trellises of the candidate transmission symbols receivable from the transmit end depending on multipath fading, using the at least one set; and
   a selector configured to select as a symbol for a receive signal, a trellis whose error with the receive signal is least among the trellises constructed in the trellis constructor, wherein the detector is configured to detect receive signals through Maximum Likelihood (ML) detection using the set.

2. The apparatus of claim 1, wherein the set constructor is configured to determine distances between candidate transmission symbols deformed through the channel estimated in the channel estimator and configured to construct a set such that candidate transmission symbols having a short distance therebetween are grouped into a different set.

3. The apparatus of claim 1, wherein the set constructor is configured to determine the distances between candidate transmission symbols using a row vector of a first channel tap of a channel matrix.

4. The apparatus of claim 1, wherein the set constructor is configured to determine distances between candidate transmission symbols deformed through the channel estimated in the channel estimator and configured to partition one set into two sets depending on the distances between candidate transmission symbols in regular sequence.

5. The apparatus of claim 4, wherein, if first partitioning a set for candidate transmission symbols, the set constructor is configured to recognize the entire candidate transmission symbols as one set and configured to group the entire candidate transmission symbols into two sets.

6. The apparatus of claim 4, wherein the set constructor is configured to determine the distances between candidate transmission symbols using a row vector of a first channel tap of a channel matrix.

7. The apparatus of claim 1, wherein the trellis constructor is configured to construct trellises of receivable candidate transmission symbols depending on a length of a channel for the receive signal, using the set of candidate transmission symbols.

8. The apparatus of claim 1, wherein the OFDM demodulators are configured to convert the signals received through the respective antennas into frequency domain signals through Fast Fourier Transform (FFT).

9. The apparatus of claim 1, wherein the OFDM demodulators are configured to convert the signals received from the respective subcarrier mappers into time domain signals through Inverse Fast Fourier Transform (IFFT).

10. A method for detecting signals in a wireless communication system of a Single-Carrier (SC) transmission scheme, the method comprising:
in response to signals being received through at least two antennas, converting time domain signals received through the respective antennas into frequency domain signals;
confirming signals mapped to frequency domain subcarriers allocated to the respective antennas in the frequency domain signals; and
converting the confirmed frequency domain signals into time domain signals;
estimating a channel using the converted time domain signals;
constructing at least one set for candidate transmission symbols transmissible from a transmit end considering the estimated channel; and
detecting receive signals through Maximum Likelihood (ML) detection using the set, wherein detecting receive signals comprises:
constructing trellises of receivable candidate transmission symbols depending on multipath fading, using the set of candidate transmission symbols; and selecting, as a symbol for a receive signal, a trellis whose error with the receive signal is least among the constructed trellises.

11. The method of claim 10, wherein converting into the frequency domain signals comprising converting the signals received through the respective antennas into frequency domain signals through Fast Fourier Transform (FFT).

12. The method of claim 10, wherein converting into the time domain signals comprises converting the signals mapped to the frequency domain subcarriers into time domain signals through Inverse Fast Fourier Transform (IFFT).

13. The method of claim 10, wherein constructing the set comprises:
calculating distances between candidate transmission symbols deformed through the estimated channel; and
constructing a set such that candidate transmission symbols having a short distance therebetween are grouped into a different set.

14. The method of claim 13, wherein calculating the distances comprises calculating the distances between candidate transmission symbols using a row vector of a first channel tap of a channel matrix.

15. The method of claim 13, wherein constructing the set comprises repeatedly partitioning one set into two sets such that candidate transmission symbols having a short distance therebetween are grouped into a different set.

16. The method of claim 15, wherein repeatedly partitioning into the two sets comprises, if first partitioning a set of candidate transmission symbols, recognizing the entire candidate transmission symbols as one set and grouping the entire candidate transmission symbols into two sets such that candidate transmission symbols having a short distance therebetween are grouped into a different set.

17. The method of claim 10, wherein constructing the trellises comprises constructing trellises of receivable candidate transmission symbols depending on a length of a channel for the receive signal, using the set of candidate transmission symbols.

* * * * *